(12) United States Patent
Shibutani et al.

(10) Patent No.: US 10,129,030 B2
(45) Date of Patent: Nov. 13, 2018

(54) INFORMATION DELIVERY SYSTEM, INFORMATION DELIVERY METHOD, SHORT-RANGE COMMUNICATION DEVICE, INFORMATION DELIVERY APPARATUS, AND SERVER

(71) Applicant: NTT DOCOMO, INC., Chiyoda-ku (JP)

(72) Inventors: Akira Shibutani, Chiyoda-ku (JP); Shigeko Kobayashi, Chiyoda-ku (JP); Kazuma Nachi, Chiyoda-ku (JP); Yuuta Higuchi, Chiyoda-ku (JP); Tetsuhiro Sasagawa, Chiyoda-ku (JP); Tetsuhiro Tanno, Chiyoda-ku (JP); Yuusaku Inoue, Chiyoda-ku (JP); Kunio Yoshikawa, Chiyoda-ku (JP); Takashi Okada, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 54 days.

(21) Appl. No.: 15/123,977

(22) PCT Filed: Jan. 16, 2015

(86) PCT No.: PCT/JP2015/051120
§ 371 (c)(1),
(2) Date: Sep. 6, 2016

(87) PCT Pub. No.: WO2015/136978
PCT Pub. Date: Sep. 17, 2015

(65) Prior Publication Data
US 2017/0019257 A1    Jan. 19, 2017

(30) Foreign Application Priority Data

Mar. 12, 2014  (JP) ................. 2014-048546

(51) Int. Cl.
*G06F 21/35* (2013.01)
*H04L 9/32* (2006.01)
(Continued)

(52) U.S. Cl.
CPC ............ *H04L 9/3228* (2013.01); *G06F 21/35* (2013.01); *G06F 21/6245* (2013.01);
(Continued)

(58) Field of Classification Search
None
See application file for complete search history.

(56) References Cited

U.S. PATENT DOCUMENTS 7,957,532 B2 * 6/2011 Chen ..................... H04L 9/0822
380/270
7,970,143 B2 * 6/2011 Vennelakanti .......... G06F 21/62
380/277

(Continued)

FOREIGN PATENT DOCUMENTS

EP    2 701 104 A1    2/2014
JP    2002-7904 A    1/2002
(Continued)

OTHER PUBLICATIONS

International Search Report dated Apr. 7, 2015 in PCT/JP2015/051120 Filed Jan. 16, 2015.
(Continued)

*Primary Examiner* — Taghi T Arani
*Assistant Examiner* — F J Farhadian
(74) *Attorney, Agent, or Firm* — Oblon, McClelland, Maier & Neustadt, L.L.P.

(57) ABSTRACT

A wearable device generates a temporary ID, generates an encrypted user ID, and transmits the temporary ID and the encrypted user ID to a shop system. The shop system receives the temporary ID and the encrypted user ID,
(Continued)

transmits a temporary ID corresponding to the received temporary ID and the encrypted user ID to a server, and transmits the temporary ID transmitted by an identifier transmission unit and waiting state information to the server. The server stores the user ID in association with an information delivery destination of the user ID, receives the encrypted user ID and the temporary ID, associates the temporary ID and the information delivery destination of the user ID, receives the temporary ID and the waiting state information, and transmits the waiting state information to the information delivery destination of the user ID corresponding to the temporary ID.

7 Claims, 9 Drawing Sheets

(51) Int. Cl.
| | |
|---|---|
| G06F 21/62 | (2013.01) |
| H04W 12/02 | (2009.01) |
| H04W 12/06 | (2009.01) |
| H04L 9/08 | (2006.01) |
| H04L 9/14 | (2006.01) |
| H04L 9/30 | (2006.01) |
| H04L 29/06 | (2006.01) |
| H04W 12/04 | (2009.01) |
| H04W 4/80 | (2018.01) |
| G06Q 10/02 | (2012.01) |
| H04W 4/12 | (2009.01) |

(52) U.S. Cl.
CPC ............ *H04L 9/0863* (2013.01); *H04L 9/14* (2013.01); *H04L 9/30* (2013.01); *H04L 63/0428* (2013.01); *H04L 63/06* (2013.01); *H04L 63/0838* (2013.01); *H04W 4/80* (2018.02); *H04W 12/02* (2013.01); *H04W 12/04* (2013.01); *H04W 12/06* (2013.01); *G06Q 10/02* (2013.01); *H04W 4/12* (2013.01)

(56) References Cited

U.S. PATENT DOCUMENTS

| | | | | |
|---|---|---|---|---|
| 8,977,568 | B1* | 3/2015 | Schattauer | G06Q 20/10 705/16 |
| 9,071,621 | B2* | 6/2015 | Kong | G06F 21/629 |
| 9,240,978 | B2* | 1/2016 | Farris | H04L 63/0471 |
| 9,251,367 | B2* | 2/2016 | Aoki | G06F 21/6245 |
| 9,621,344 | B2* | 4/2017 | Machani | H04L 9/0897 |
| 9,727,328 | B2* | 8/2017 | Johnson | G06F 8/65 |
| 9,729,540 | B2* | 8/2017 | Bell | H04L 63/0823 |
| 2007/0297610 | A1* | 12/2007 | Chen | H04L 9/0822 380/270 |
| 2009/0305671 | A1 | 12/2009 | Luft et al. | |
| 2011/0055914 | A1* | 3/2011 | Sugahara | G06F 17/30867 726/12 |
| 2011/0302406 | A1* | 12/2011 | Machani | H04L 9/0897 713/150 |
| 2012/0079019 | A1* | 3/2012 | Miettinen | G06Q 50/00 709/204 |
| 2013/0103939 | A1* | 4/2013 | Radpour | H04L 9/083 713/152 |
| 2013/0117820 | A1* | 5/2013 | Cherian | H04L 63/06 726/4 |
| 2014/0058770 | A1* | 2/2014 | Kim | H04W 4/008 705/5 |
| 2014/0325592 | A1* | 10/2014 | Unagami | G06F 21/6254 726/1 |
| 2015/0245207 | A1 | 8/2015 | Luft et al. | |
| 2015/0381610 | A1* | 12/2015 | Poornachandran | H04L 63/0853 713/155 |
| 2016/0156716 | A1* | 6/2016 | Murakami | H04W 4/043 709/217 |
| 2016/0249217 | A1 | 8/2016 | Luft et al. | |
| 2017/0134956 | A1* | 5/2017 | Radpour | H04W 12/08 |

FOREIGN PATENT DOCUMENTS

| | | | |
|---|---|---|---|
| JP | 2005-222292 | * | 8/2005 |
| JP | 2005-222292 A | | 8/2005 |
| WO | 2010/119626 A1 | | 10/2010 |

OTHER PUBLICATIONS

Extended European Search Report dated Jan. 12, 2017 in Patent Application No. 15760717.7.
Office Action dated Jan. 17, 2017 in Japanese Patent Application No. 2014-048546 (with unedited computer generated English translation).
International Preliminary Report on Patentability and Written Opinion dated Sep. 22, 2016 in corresponding PCT/JP2015/051120 (English translation only).

* cited by examiner

Fig.3

| USER ID | TEMPORARY ID | VALID SHOP ID | EXPIRATION TIME |
|---|---|---|---|
| aaa001 | Kioewaja | DWlgdfaie | 2013/10/3 22:00 |
| bbb002 | ageawouiW | dyDUIeDe | 2013/10/3 23:00 |
| | WgeawdSe | yriDUIefan | 2013/10/4 18:00 |
| ccc003 | EGWEIOPo | ZljoiefawD | 2013/10/5 18:00 |
| ... | ... | ... | ... |

Fig.5

| ISSUED TEMPORARY ID | SHOP ID | EXPIRATION TIME |
|---|---|---|
| ageawouiW | dyDUIeDe | 2013/10/3 23:00 |
| WgeawdSe | yriDUIefan | 2013/10/4 18:00 |

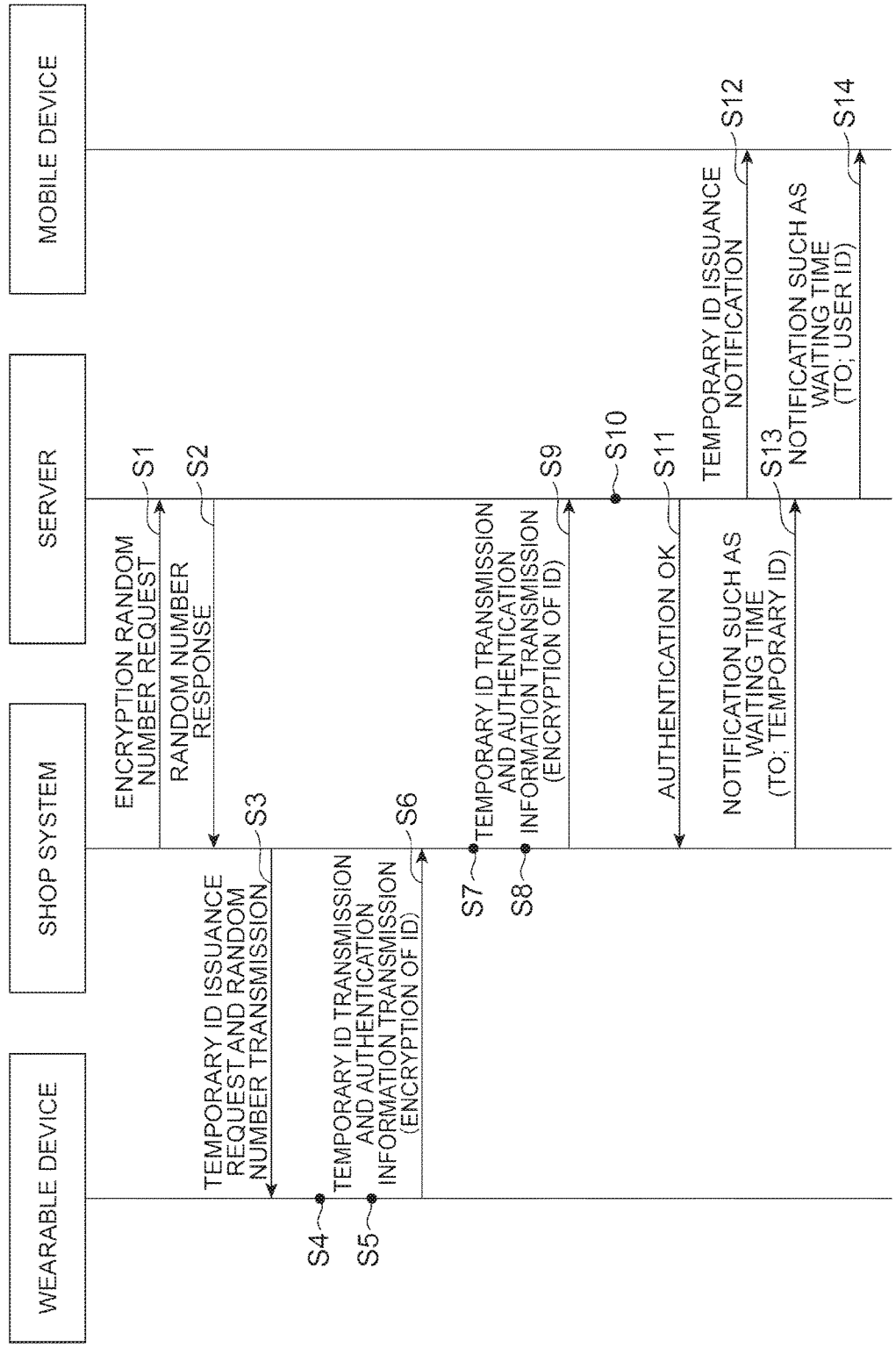

INFORMATION DELIVERY SYSTEM, INFORMATION DELIVERY METHOD, SHORT-RANGE COMMUNICATION DEVICE, INFORMATION DELIVERY APPARATUS, AND SERVER

TECHNICAL FIELD

The present invention relates to an information delivery system, an information delivery method, a short-range communication device, an information delivery apparatus, and a server.

BACKGROUND ART

Conventionally, systems protect the privacy of users using temporarily used IDs (for example, see Patent Literature 1).

In Patent Literature 1, a system includes a terminal apparatus, a service delivery apparatus, and an authentication apparatus. The authentication apparatus manages an ID of the terminal apparatus, and login information (an ID and a password) for each service delivery apparatus. The terminal apparatus transmits a temporarily used one-time ID to the service delivery apparatus and further transmits the one-time ID and the ID of the terminal apparatus to the server. The service delivery apparatus transmits the one-time ID received from the terminal apparatus to the server, receives a corresponding user ID and password from the server, and determines whether to deliver a service.

In this case, the service delivery apparatus cannot know an ID used in another service delivery apparatus by a certain terminal apparatus. Accordingly, even when the user uses services from a plurality of service delivery apparatuses by so-called single sign-on, it is possible to prevent information about terminals (for example, personal information) from being tracked for a plurality of service providers.

CITATION LIST

Patent Literature

[Patent Literature 1] PCT International Publication No. WO 2010/119626

SUMMARY OF INVENTION

Technical Problem

By the way, when waiting his/her turn in a shop or the like (a restaurant or a hospital), he/she often waits in a place thereof because he/she does not know when his/her turn is reached. If a state of a waiting list (for example, the remaining number of persons before his/her turn and a waiting time) can be known in a place away from the shop or the like, it is unnecessary to wait within the shop for a long time. As a solution, a process of notifying the shop of an email address, a phone number, or the like and receiving the email for the email address from the shop side or receiving a phone call addressed to the phone number is considered. However, easily notifying the shop of personal information such as the email address or the phone number is not necessarily desirable from the point of view of personal information protection. As another method, there is also a method of borrowing a call bell capable of being applied to a short-range range from the shop. However, in this case, not only an application range is limited (for example, limited to the same floor), but also specific information (for example, a waiting time or the like) is not obtained.

Therefore, without notifying the shop (a service provider) of the email address or the phone number, disclosing a temporarily used ID to the shop and receiving information from the shop using the temporarily used ID is considered. For example, in the case as described in Patent Literature 1, the terminal apparatus transmits information to each of the service delivery apparatus and the server. That is, it is necessary for the terminal apparatus to perform a process for a plurality of apparatuses and the process is complex. For example, the case in which an apparatus corresponding to the terminal apparatus described in Patent Literature 1 is a short-range communication device capable of performing communication by short-range communication with the service delivery apparatus (for example, an apparatus in the shop or the like) is assumed. In this case, it is difficult to directly perform communication from a short-range communication device to a server. Consequently, when the short-range communication device is assumed to be used, and it is desirable to deliver information from the service delivery apparatus (an information delivery apparatus) to a user of the short-range communication device with only the short range communication device performing the short-range communication with the service delivery apparatus and without notifying the service delivery apparatus of content of personal information.

To solve the above-mentioned problem, an objective of the present invention is to provide an information delivery system, an information delivery method, a short-range communication device, an information delivery apparatus, and a server capable of delivering information from an information delivery apparatus to a user of a short-range communication device with a simple operation while protecting personal information.

Solution to Problem

An information delivery system according to an embodiment is an information delivery system including an information delivery apparatus configured to provide information, a short-range communication device capable of performing short-range communication with the information delivery apparatus, and a server capable of communicating with the information delivery apparatus, wherein the short-range communication device includes: a temporary identifier acquisition means configured to acquire a temporarily usable temporary identifier; an encrypted identifier acquisition means configured to acquire an encrypted identifier from encrypting a user identifier which is an identifier corresponding to the short-range communication device; and an identifier transmission means configured to transmit the temporary identifier acquired by the temporary identifier acquisition means and the encrypted identifier acquired by the encrypted identifier acquisition means to the information delivery apparatus, wherein the information delivery apparatus includes: an identifier reception means configured to receive the temporary identifier and the encrypted identifier from the short-range communication device; an information delivery apparatus-side identifier transmission means configured to transmit a temporary identifier received by the identifier reception means and the encrypted identifier to the server; and an information delivery means configured to transmit the temporary identifier transmitted by the information delivery apparatus-side identifier transmission means and information of a delivery target to the server, and wherein the server includes: an information delivery destination information retention means configured to retain, the user identifier in association with the information delivery destination of the user identifier; a server-side identifier reception means configured to receive the temporary identifier and the encrypted identifier from the information delivery apparatus; an association means configured to decrypt the encrypted identifier received by the server-side identifier reception means and perform association with the temporary identifier received by the server-side identifier reception means to associate the temporary identifier received by the server-side identifier reception means and the information delivery destination of the user identifier received using a decrypted user identifier; an information reception means configured to receive the temporary identifier and the information of the delivery target from the information delivery means; and an information transmission means configured to transmit the information of the delivery target received by the information reception means to the information delivery destination retained in the information delivery destination information retention means in association with the user identifier corresponding to the temporary identifier received by the information reception means on the basis of the association by the association means.

An information delivery method according to an embodiment of the present invention is an information, delivery method to be executed by an information delivery system including an information delivery apparatus configured to provide information, a short-range communication device capable of performing short-range communication with the information delivery apparatus, and a server capable of communicating with the information delivery apparatus, wherein the server includes an information delivery destination information retention means configured to retain a user identifier which is an identifier corresponding to the short-range communication device in association with an information delivery destination of the user identifier, the information delivery method including: a temporary identifier acquisition step of acquiring, by the short-range communication device, a temporarily usable temporary identifier; an encrypted identifier acquisition step of acquiring, by the short-range communication device, an encrypted identifier by encrypting the user identifier; an identifier transmission step of transmitting, by the short-range communication device, the temporary identifier acquired in the temporary identifier acquisition step and the encrypted identifier acquired in the encrypted identifier acquisition step to the information delivery apparatus; an identifier reception step of receiving, by the information delivery apparatus, the temporary identifier and the encrypted identifier from the short-range communication device; an information delivery apparatus-side identifier transmission step of transmitting, by the information delivery apparatus, the temporary identifier received in the identifier reception step and the encrypted identifier to the server; an information delivery step of transmitting, by the information delivery apparatus, the temporary identifier transmitted in the information delivery apparatus-side identifier transmission step and information of a delivery target to the server; a server-side identifier reception step of receiving, by the server, the temporary identifier and the encrypted identifier from the information delivery apparatus; an association means of decrypting, by the server, the encrypted identifier received in the server-side identifier reception step and associating the temporary identifier received in the server-side identifier reception step and the information delivery destination of the user identifier using a decrypted user identifier; an information reception step of receiving, by the server, the temporary identifier and the information of the delivery target by the information delivery step; and an information transmission step of transmitting, by the server, the information of the delivery target received in the information reception step to the information delivery destination of the user identifier corresponding to the temporary identifier received in the information reception step on the basis of the association in the association step.

According to the information delivery system and the information delivery method according to the embodiments of the present invention, the encrypted user identifier and the temporary identifier acquired by the short-range communication device are transmitted to the information delivery apparatus. The information delivery apparatus transmits the encrypted user identifier and the temporary identifier to the server. The server decrypts the encrypted user identifier and the pre-retained identifier (user identifier) and transmission destination information corresponding to the short-range communication device and the temporary identifier received from the information delivery apparatus are associated on the basis of the decrypted user identifier. When the information delivery apparatus transmits the temporary identifier and the information of the delivery target to the server, the server is configured to deliver the information of the delivery target to the transmission destination of the user identifier corresponding to the temporary identifier.

In this case, the information delivery system and the information delivery method can deliver the information delivered by the information delivery apparatus to the transmission destination corresponding to the short-range communication device via the server. Also, because the short-range communication device transmits the encrypted user identifier to the information delivery apparatus and the information delivery apparatus cannot identify content of the user identifier, the information delivery system can protect personal information. When the short-range communication device transmits the temporary identifier and the encrypted user identifier to the information delivery apparatus once, the information of the delivery target from the information delivery apparatus is transmitted to the transmission destination corresponding to the short-range communication device via the server. Consequently, the information delivery system and the information delivery method can deliver information from the information delivery apparatus by a simple operation. That is, the information delivery system and the information delivery method can deliver information from the information delivery apparatus by a simple operation while protecting personal information.

In the information delivery system according to the embodiment of the present invention, the temporary identifier means of the short-range communication device acquires the temporary identifier by generating it and the encrypted identifier acquisition means acquires the encrypted identifier by generating it. In this case, because the short-range communication device generates the temporary identifier and the encrypted user identifier, the short-range communication device can be implemented by a simpler configuration than when a temporary identifier and an encrypted user identifier are acquired from another apparatus.

In the information delivery system according to the embodiment of the present invention, the server may further include a server-side encryption information transmission means configured to transmit encryption information which is information for encrypting the user identifier to the information delivery apparatus, the information delivery apparatus may further include: an information delivery apparatus-side encryption information reception means configured to receive the encryption information from the server; and an information delivery apparatus-side encryption information transmission means configured to transmit the encryption information received by the information delivery apparatus-side encryption information reception means to the short-range communication device, the short-range communication device may further include an encryption information reception means configured to receive the encryption information from the information delivery apparatus, and the encrypted identifier acquisition means may encrypt the user identifier using the encryption information received by the encryption information reception means. According to this information delivery system, it is possible to encrypt the user identifier without direct communication of the short-range communication device with the server because encryption information is received from the server via the information delivery apparatus.

Also, in the information delivery system according to the embodiment of the present invention, the short-range communication device may further include a temporary identifier retention means configured to retain a temporary identifier previously generated by the temporary identifier acquisition means, and the temporary identifier acquisition means may generate a temporary identifier different from the temporary identifier retained by the temporary identifier retention means. In this case, because the short-range communication device generates a temporary identifier different from a temporary previously generated by the short-range communication device, it is possible to prevent a duplicate temporary identifier of a temporary identifier transmitted to another information delivery device by the short-range communication device from being generated.

Also, in the information delivery system according to the embodiment of the present invention, the information delivery apparatus may further include a temporary identifier editing means configured to add information for identifying the information delivery apparatus to the temporary identifier received by the identifier reception means, and the information delivery apparatus-side identifier transmission means may transmit the temporary identifier edited by the temporary identifier editing means as the temporary identifier. In this case, because the information delivery apparatus adds information for identifying the information delivery apparatus to the temporary identifier received from the short-range communication device, it is possible to avoid duplication of the temporary identifier transmitted to another information delivery apparatus by the short-range communication device.

Also, in the information delivery system according to the embodiment of the present invention, the association means of the server may associate an expiration time with the associated temporary identifier and cancel the association of the user identifier retained by the information delivery destination information retention means and the temporary identifier when the expiration time has passed. In this case, because the server cancels the association of the temporary identifier and the identifier (user identifier) corresponding to the short-range communication device when the expiration time has passed, it is possible to prevent unnecessary information from being delivered from the information delivery apparatus regardless of the fact that a long time has elapsed after the transmission of the temporary identifier by the short-range communication device.

An information delivery apparatus according to an embodiment of the present invention is an information delivery apparatus in an information delivery system including the information delivery apparatus configured to provide information, a short-range communication device capable of performing short-range communication with the information delivery apparatus, and a server capable of communicating with the information delivery apparatus, the information delivery apparatus including: an identifier reception means configured to receive a temporary identifier and an encrypted identifier from the short-range communication device; an information delivery apparatus-side identifier transmission means configured to transmit the temporary identifier received by the identifier reception means and the encrypted identifier to the server; and an information delivery means configured to transmit the temporary identifier transmitted by the information delivery apparatus-side identifier transmission means and information of a delivery target to the server.

A short-range communication device according to an embodiment of the present invention is a short-range communication device in an information delivery system including an information delivery apparatus configured to provide information, the short-range communication device capable of performing short-range communication with the information delivery apparatus, and a server capable of communicating with the information delivery apparatus, the short-range communication device including: a temporary identifier acquisition means configured to acquire a temporarily usable temporary identifier; an encrypted identifier acquisition means configured to acquire an encrypted identifier by encrypting a user identifier which is an identifier corresponding to the short-range communication device;

and an identifier transmission means configured to transmit the temporary identifier acquired by the temporary identifier acquisition means and the encrypted identifier acquired by the encrypted identifier acquisition means to the information delivery apparatus.

A server according to an embodiment of the present invention is a server in an information delivery system including an information delivery apparatus configured to provide information, a short-range communication device capable of performing short-range communication with the information delivery apparatus, and the server capable of communicating with the information delivery apparatus, the server including: an information delivery destination information retention means configured to retain a user identifier in association with an information delivery destination of the user identifier; a server-side identifier reception means configured to receive a temporary identifier and an encrypted identifier from the information delivery apparatus; an association means configured to decrypt the encrypted identifier received by the server-side identifier reception means and associate the temporary identifier received by the server-side identifier reception means and the information delivery destination of the user identifier using a decrypted user identifier; an information reception means configured to receive the temporary identifier and information of a delivery target from the information delivery means; and an information transmission means configured to transmit the information of the delivery target received by the information reception means to the information delivery destination retained in the information delivery destination information retention means in association with the user identifier corresponding to the temporary identifier received by the information reception means on the basis of the association by the association means.

Advantageous Effects of Invention

According to an embodiment of the present invention, it is possible to deliver information from an information delivery apparatus to a user of a short-range communication device by a simple operation while protecting personal information.

BRIEF DESCRIPTION OF DRAWINGS

FIG. 3 is a diagram illustrating an example of temporary ID management information.

FIG. 5 is a diagram illustrating an example of history information of a temporary ID.

FIG. 9 is a sequence diagram of a process by an information delivery system.

DESCRIPTION OF EMBODIMENTS

Figure 1:
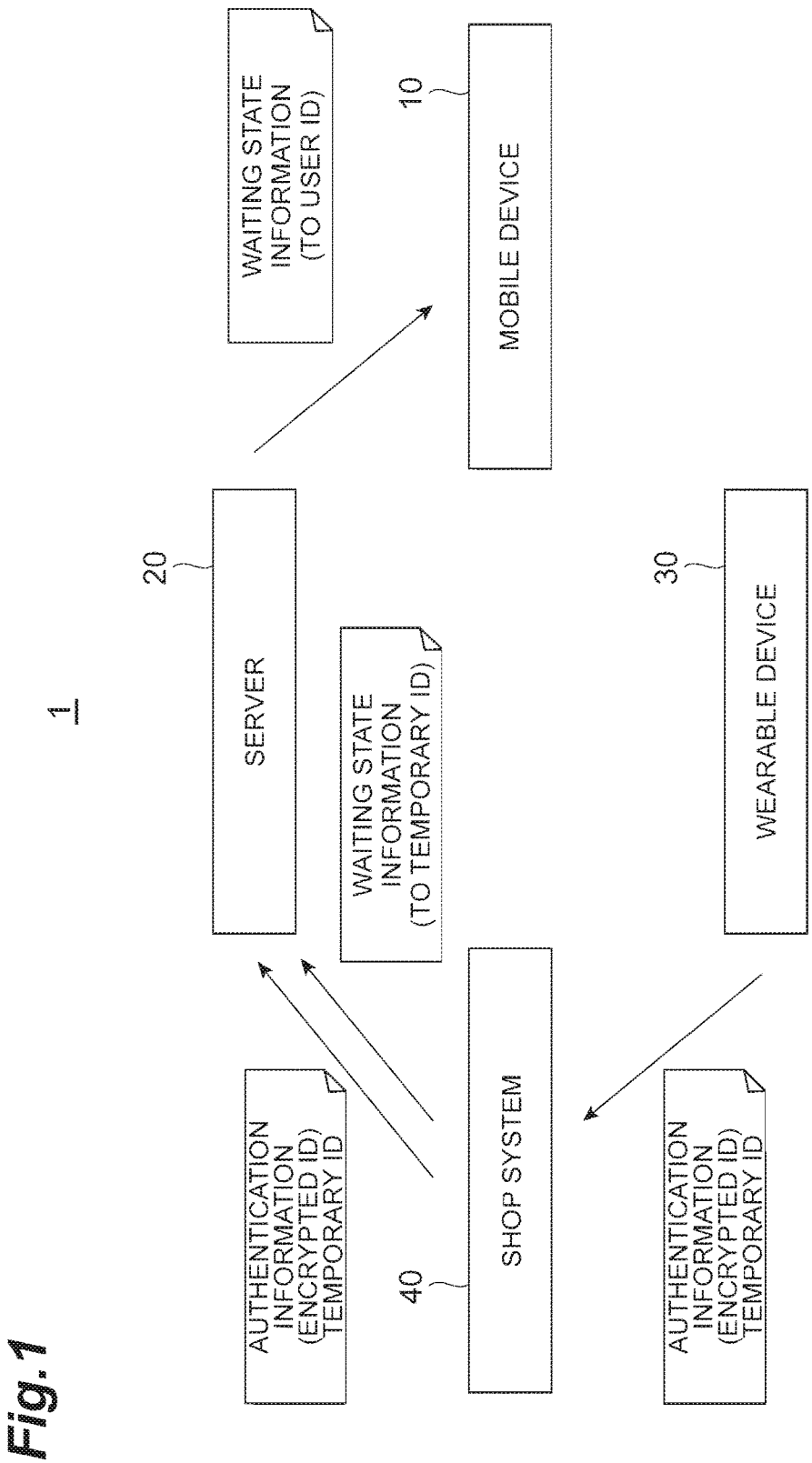
FIG. 1 is a schematic diagram of an information delivery system according to an embodiment of the present invention.

Hereinafter, embodiments of the present invention will be described in detail with reference to the accompanying drawings. Also, the same or like elements will be denoted by the same reference numerals throughout the description of the drawings, without redundant description.

FIG. 1 is a schematic diagram of an information delivery system 1 (an information delivery system) according to an embodiment of the present invention. The information delivery system 1 is configured to include a mobile device 10, a server 20 (a server), a wearable device 30 (a short-range communication device), and a shop system 40 (an information delivery apparatus). The mobile device 10 and the wearable device 30 can communicate with each other through short-range communication. The server 20 and the mobile device 10 communicate with each other through mobile communication (specifically, for example, mobile communication such as 3G or LTE). When communication by the mobile communication is performed, a facility of a mobile communication network such as a base station is used for the communication. The wearable device 30 and the shop system 40 can communicate with each other through short-range communication (specifically, for example, Bluetooth (registered trademark) low energy (BLE) or near field communication (NFC)). The shop system 40 and the server 20 can communicate with each other through a communication method (for example, a communication method via a communication network serving as a backbone such as the Internet) other than the short-range communication such as wired communication. Also, the mobile device 10 and the wearable device 30 may be integrated. Also, normally, the user of the mobile device 10 and the user of the wearable device 30 are the same user.

When a user waits his/her turn in a certain shop, the information delivery system 1 delivers waiting state information to the user making a reservation in a waiting list (the user of the wearable device 30 and the mobile device 10). This waiting state information is information indicating a waiting state such as a waiting time (for example, X minutes remaining). For example, the case in which the user waits his/her turn for a long time (for example, about one hour) is assumed to be occurring as a result of the user carrying the wearable device 30 and the mobile device 10 visiting a certain shop (for example, a restaurant). In this case, when the above-mentioned user moves the wearable device 30 near the shop system 40 provided in the shop (for example, the wearable device 30 is held to a reader part of the shop system 40), the shop system 40 transmits waiting state information to the mobile device 10 via the server 20 thereafter.

The wearable device 30 is an apparatus capable of being worn by the user and is a so-called wearable module. Specifically, it is only necessary for the wearable device 30 to have a short-range communication function as a function of inputting/outputting information from/to the outside and it is unnecessary to have a screen display function, a sound output function, an operation input reception function, etc. However, these functions may be provided. As a specific form of the wearable device 30, any form capable of being mounted by the user such as a ring type or a wristwatch type can be provided.

When the wearable device 30 is moved near the shop system 40, the shop system 40 requests the wearable device 30 to transmit an encrypted user ID (user identifier) and a temporary ID in response to this. Here, the user ID is information for identifying the user of the wearable device 30 and the mobile device 10. Also, in place of the user ID, an identifier of the wearable device 30 or an identifier of the mobile device 10 may be used. The temporary ID is a temporarily usable identifier (a temporary identifier).

The wearable device 30 generates the temporary ID by a well-known random number generation method or the like and transmits the temporary ID and a pre-retained encrypted user ID to the shop system 40.

The shop system 40 is a computer (for example, a personal computer or the like) provided in a shop (a hospital, a restaurant, or the like). As mentioned above, the shop system 40 delivers waiting state information via the server 20. The shop system 40 can perform short-range communication as mentioned above, and requests the wearable device 30 to transmit an encrypted user ID and a temporary ID when it is detected that the wearable device 30 is moved near the shop system and receives the encrypted user ID and the temporary ID from the wearable device 30.

The shop system 40 transmits the user ID and the temporary ID received from the wearable device 30 to the server 20. Also, the shop system 40 transmits the temporary ID and the waiting state information to the server 20.

The server 20 is a server apparatus for cloud computing or a server apparatus which, performs an authentication process. The server 20 retains user management information which is information obtained by associating the above-mentioned user ID and transmission destination information for the mobile device 10 (for example, an email address). When the encrypted user ID and the temporary ID are received from the shop system 40, the server 20 decrypts the encrypted user ID. The server 20 determines whether the decrypted user ID is included among user IDs of the user management information and associates the received temporary ID and the transmission destination information for the mobile device 10 (for example, the email address) when the decrypted user ID is included. The server 20 determines whether the decrypted user ID is included among the user Ms of the user management information and notifies the shop system 40 of an abnormal termination because the received temporary ID and the transmission destination information for the mobile device 10 cannot be associated when the decrypted user ID is not included (notification indicating that the association is impossible). In this case, an indication of an abnormal termination may be output to a display means provided in the shop system 40. Thus, the server 20 determines whether the function of the present embodiment is usable by determining whether the user ID retained by the server 20 matches the user ID transmitted from the shop system 40. That is, the information delivery system 1 treats the user ID as authentication information (information for authentication).

The server 20 receives the temporary ID and the waiting state information from the shop system 40. In this case, the server 20 retrieves an associated temporary ID which is the same as the received temporary ID among associated temporary IDs. The server 20 transmits the waiting state information to the transmission destination included in the user management information corresponding to the retrieved temporary ID (the transmission destination for the mobile device 10).

The mobile device 10 is specifically a portable phone including a smartphone. The mobile device 10 receives the waiting state information transmitted by the shop system 40, from the server 20 and displays the information.

Thus, in the information delivery system 1, the wearable device 30 transmits an encrypted user ID and a temporary ID to the shop system 40. The shop system 40 transmits the encrypted user ID and the temporary ID to the server 20. The server 20 decrypts the encrypted user ID and associates the temporary ID and the user management information on the basis of the decrypted user ID and the user IDs of the pre-retained user management information (that is, associates the temporary ID and the transmission destination for the mobile device 10). In this case, if the shop system 40 transmits the temporary ID and the waiting state information to the server 20, it is possible to notify the mobile device 10 of the waiting state information. That is, in the information delivery system 1, the shop system 40 can notify the transmission destination corresponding to the temporary ID of the waiting state information by merely transmitting the waiting state information for the temporary ID.

Figure 2:
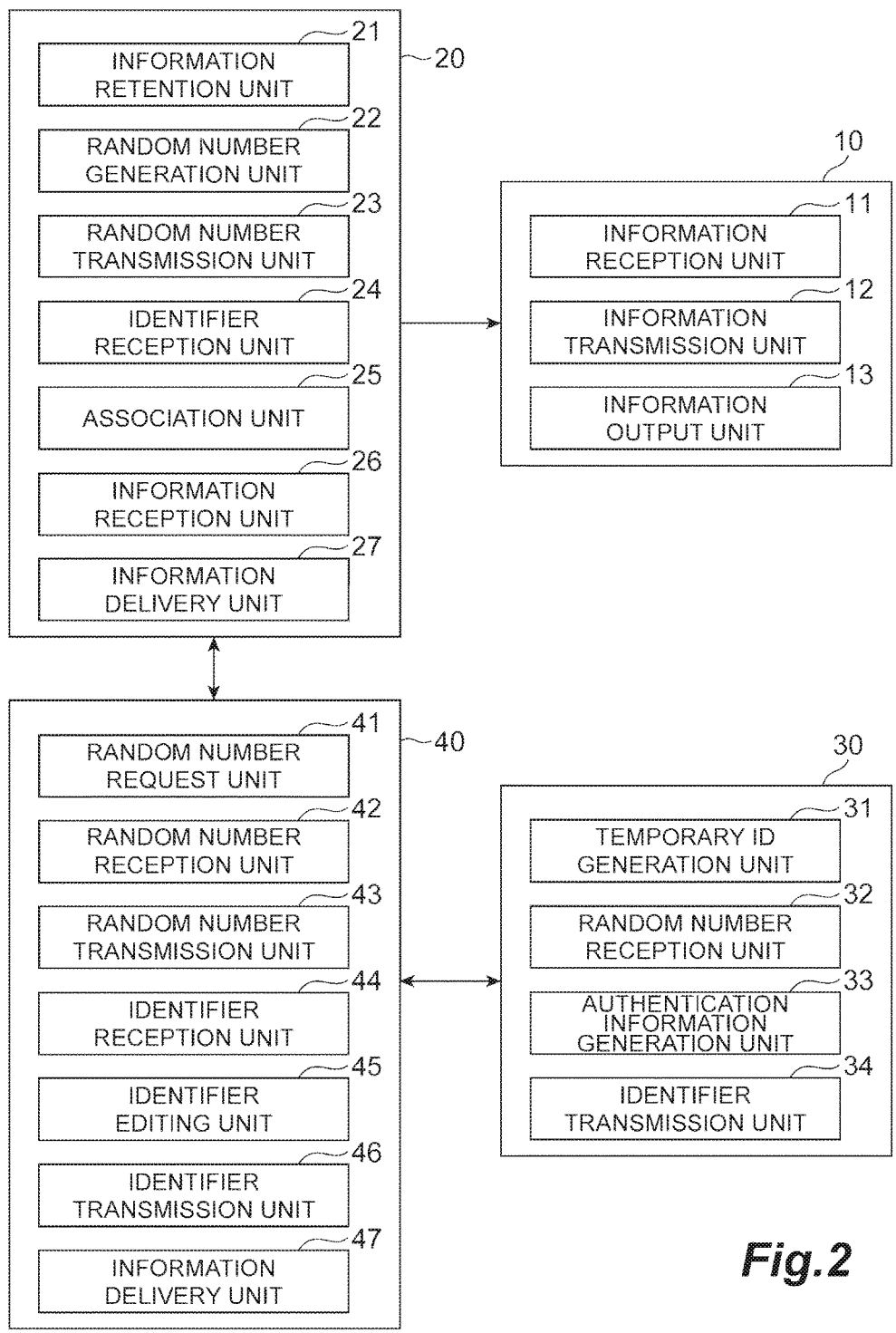
FIG. 2 is a block diagram of an information delivery system according to an embodiment of the present invention.

Next, a functional block diagram of the mobile device 10, the server 20, the wearable device 30, and the shop system 40 is illustrated in FIG. 2. First, the mobile device 10 will be described. The mobile device 10 includes an information reception unit 11, an information transmission unit 12, and an information output unit 13.

The information reception unit 11 is a part which receives information transmitted by the server 20. Specifically, the information reception unit 11 receives a notification of issuance of the temporary ID from the server 20. The notification of the issuance of the temporary ID is a notification indicating that the server 20 has associated the temporary ID and the transmission destination for the mobile device 10. The server 20 transmits the issuance notification to the mobile device 10, thereby notifying that the temporary ID has been issued to the user of the mobile device 10. That is, as a result of the user of the mobile device 10 moving the wearable device 30 near the shop system 40, it is possible to confirm that the temporary ID has been generated normally. Also, the user of the mobile device 10 can also confirm that the temporary ID has been fraudulently generated. As an example in which the temporary ID is fraudulently generated, there is a case in which the wearable device 30 is stolen by others and the temporary ID is generated as a result of the wearable device 30 being moved near the shop system 40, etc.

For example, there is a notification including a message of "In shop A, a temporary ID having an expiration time of 10/13 18:00 has been issued. Please click here if you are not aware of it." Also, within the above-mentioned message, a link to "here" is affixed. The notification of the issuance of the temporary ID includes expiration time information of the temporary ID (a time limit for which the authentication information and the temporary ID are associated) and a name of a shop corresponding to the shop system 40 notifying the server 20 of the temporary ID. In the case of the above-mentioned message, "10/13 18:00" corresponds to the expiration time and "shop A" corresponds to the name of the shop corresponding to the shop system 40 providing the notification of the temporary ID. Also, the notification of the issuance of the temporary ID also includes information (link information) in which the cancellation of association of the temporary ID and the transmission destination for the mobile device 10 is received. In the case of the above-mentioned message, the link of a description part with "here" corresponds to information in which the cancellation of the association is received. The notification of the issuance of the temporary ID received by the information reception unit 11 is output to a screen or the like of the mobile device 10 by the information output unit 13.

When the user of the mobile device 10 determines that a result of confirming the notification of the issuance of the temporary ID indicates that the temporary ID has been fraudulently generated, the information transmission unit 12 of the mobile device 10 requests the server 20 to cancel the association when the user performs an input operation for the mobile device 10 (an operation of selecting link information of the notification of issuance of the temporary ID).

Also, the information reception unit 11 receives waiting state information transmitted by the shop system 40, from the server 20. The waiting state information received by the information reception unit 11 is output to the screen or the like of the mobile device 10 by the information output unit 13. A communication interface for communicating with the server 20 through mobile communication functions as the information reception unit 101.

The information transmission unit 12 is a part which transmits information to the server 20. Specifically, when the notification of the issuance of the above-mentioned temporary ID is output to the screen of the mobile device 10, the information transmission unit 12 transmits a request for cancelling the association of the authentication information and the temporary ID to the server 20 when the cancellation of the association of the authentication information an the temporary ID is received by the input operation for the mobile device 10. Also, the information transmission unit 12 transmits information about an information delivery destination of a user ID or a user identifier to the server 20. The server 20 retains the information as user management information. A communication interface for communicating with the server 20 through mobile communication functions as the information transmission unit 12.

Next, the server 20 will be described. The server 20 is configured to include an information retention unit 21 (an information delivery destination information retention means), a random number generation unit 22, a random number transmission unit 23 (a server-side encryption information transmission means), an identifier reception unit 24 (a server-side identifier reception means), an association unit

25 (an association means), an information reception unit 26 (an information reception means), and an information delivery unit 27 (an information transmission means).

The information retention unit 21 is a part which retains information. Specifically, the information retention unit 21 retains user management information (information delivery destination information) which is information obtained by associating a user ID and an information delivery destination of the user ID. The information delivery destination of the user ID is information about a notification destination for the mobile device 10, and is, specifically, an email address, a phone number, or the like to which a notification for the mobile device 10 can be provided.

Also, the server 20 receives the user ID and the information delivery destination of the user ID from the mobile device 10 and registers the received information as the user management information.

Also, the information retention unit 21 retains information obtained by associating the temporary ID and the user ID (temporary ID management information). The temporary management information is generated by the association unit 25 to be described below and registered in the information retention unit 21.

An example of the temporary ID management information is illustrated in FIG. 3. As illustrated in FIG. 3, the temporary ID management information is information obtained by associating a user ID, a temporary ID, a valid shop ID, and an expiration time. The temporary ID management information can be represented in the form of a table. Also, similar to a user ID "bbb002" illustrated in FIG. 3, the same user ID may be associated with a plurality of temporary IDs.

The valid shop ID is an identifier (a shop ID) indicating a shop in which the shop system 40 is installed. The expiration time is information indicating a time limit for which authentication information and the temporary ID are associated. The server 20 receives information about the valid shop ID and the expiration time from the shop system 40 (for example, when the temporary ID is received).

The temporary ID management information is not limited to information as illustrated in FIG. 3, and it is only necessary for the temporary ID management information to indicate the association of the user ID and the temporary ID. For example, the temporary ID management information may be information obtained by dividing the table form illustrated in FIG. 3 into a plurality of tables. Also, the information retention unit 21 is implemented by a storage means (a memory or the like) of the server 20.

The random number generation unit 22 is a part which generates a random number (encryption information) by a well-known random number generation method. For example, the random number generation unit 22 generates a random number according to the reception of a random number transmission request from the shop system 40. The server 20 transmits the random number to the wearable device 30 via the shop system 40. The wearable device 30 encrypts the user ID using the random number. The random number generation unit 22 is implemented by an arithmetic function of a control unit (for example, a CPU or the like) of the server 20.

The random number transmission unit 23 is a part which transmits a random number generated by the random number generation unit 22 to the shop system 40. The random number transmission unit 23 is implemented by a communication interface of the server 20 or a communication control unit which controls the communication interface.

The identifier reception unit 24 is a part which receives the temporary ID and the encrypted user ID from the shop system 40. Also, the identifier reception unit 24 may be configured to receive a valid shop ID and an expiration time. The identifier reception unit 24 is implemented by the communication interface of the server 20 or the communication control unit which controls the communication interface. When the identifier reception unit 24 receives the temporary ID and the encrypted user ID from the shop system 40, the association unit 25 associates the above-mentioned temporary ID and an information delivery destination of the user ID corresponding to the encrypted user ID using relevant information.

The association unit 25 is a part which decrypts the encrypted user ID received by the identifier reception unit 24 and associates the temporary ID received by the identifier reception unit 24 and the information delivery destination of the user ID (information about the notification destination for the mobile device 10) using the decrypted user ID. The association unit 25 decrypts the encrypted user ID by a well-known decryption method using a random number generated by the random number generation unit 22 and pre-retained decryption function information. The association unit 25 determines whether the decrypted user ID matches any one of user IDs of the user management information. When a result of the association unit 25 performing the determination indicates that the decrypted user ID matches any one of the user IDs of the user management information, there is user management information corresponding to the decrypted user ID. That is, the association unit 25 can associate the temporary ID and the transmission destination for the mobile device 10 (information about a notification destination for the mobile device 10 in the user management information including a user ID matching the decrypted user ID). Thus, the association unit 25 registers an association result as temporary ID management information on the basis of the information received by the identifier reception unit 24. Specifically, the association unit 25 associates the decrypted user ID, the temporary ID, the valid shop ID, and the expiration time and registers an association result as the temporary ID management information.

Also, when the expiration time has passed, the association unit 25 cancels the association of the temporary ID and the information delivery destination of the user ID. Specifically, the association unit 25 refers to the expiration time of the temporary ID management information at a predetermined timing and deletes the temporary ID management information for which the expiration time has passed. Also, the association unit 25 cancels the association of the temporary ID and the information delivery destination of the user ID when an association cancellation request (a cancellation request by a selection operation on link information of a notification of issuance of the temporary ID in the mobile device 10) is received from the mobile device 10. Thus, the association unit 25 deletes a correspondence relationship between the temporary ID and the user ID by deleting the temporary ID management information for which the expiration time has passed. As a result, the association unit 25 also deletes a correspondence relationship between the temporary ID and the information delivery destination of the user ID. Also, the association unit 25 is implemented by the control unit (for example, the CPU or the like) of the server 20.

The information reception unit 26 is a part which receives a temporary ID and waiting state information (information about a delivery target) from the shop system 40. The random number transmission unit 23 is implemented by the communication interface of the server 20 or the communication control unit which controls the communication interface.

The information delivery unit 27 is a part which transmits the waiting state information received by the information reception unit 26 to the information delivery destination of the user ID corresponding to the temporary ID received by the information reception unit 26 on the basis of the association by the association unit 25. Specifically, the information delivery unit 27 retrieves temporary ID management information including a temporary ID matching the temporary ID received by the information reception unit 26. The information delivery unit 27 retrieves user management information including a user ID of the retrieved temporary ID management information. The information delivery unit 27 transmits waiting state information on the basis of the transmission destination for the mobile device 10 included in the retrieved user management information. The information delivery unit 27 is implemented by the communication interface of the server 20, the communication control unit which controls the communication interface, or a control unit of the server 20.

Next, the shop system 40 will be described. The shop system 40 is configured to include a random number request unit 41, a random number reception unit 42 (an information delivery apparatus-side encryption information reception means), a random number transmission unit 43 (an information delivery apparatus-side encryption information transmission means), an identifier reception unit 44 (an identifier reception means), an identifier editing unit 45 (a temporary identifier editing means), an identifier transmission unit 46 (an information delivery apparatus-side identifier transmission means), and an information delivery unit 47 (an information delivery means).

The random number request unit 41 is a part which requests the server 20 to transmit a random number. When it is detected that the wearable device 30 is moved near the shop system 40 by well-known technology, the random number request unit 41 requests the server 20 to transmit a random number. The random number request unit 41 is implemented by a communication interface of the shop system 40, a communication control unit which controls the communication interface, or a control unit of the shop system 40. The random number reception unit 42 receives the random number from the server 20 by a request from the random number request unit 41.

The random number reception unit 42 is a part which receives the random number from the server 20. Specifically, when the random number request unit 41 requests the server 20 to transmit the random number, the random number reception unit 42 receives the random number from the server 20. The random number reception unit 42 is implemented by a communication interface of the shop system 40 or a communication control unit which controls the communication interface.

The random number transmission unit 43 is a part which transmits a random number received from the server 20 by the random number reception unit 42 to the wearable device 30. Also, the random number transmission unit 43 sends an issuance request (a transmission request) for the temporary ID to the wearable device 30. When the issuance request for the temporary ID is made, the random number transmission unit 43 may be configured to transmit expiration time information and a shop ID to the wearable device 30. This shop ID is information pre-retained in the memory of the shop system 40. Also, the expiration time information is information defined from a predetermined reference time (for example, a random number transmission time or the like) and period information (for example, two hours) pre-retained by the shop system 40. For example, when the period information is two hours at a reference time of 15:00, the control unit of the shop system 40 adds the period information to the reference time and sets 17:00 which is as an addition result as the expiration time. The random number transmission unit 43 is implemented by the communication interface of the shop system 40 or the communication control unit which controls the communication interface.

The identifier reception unit 44 is a part which receives a temporary ID and an encrypted user ID from the wearable device 30. Specifically, after the random number transmission unit 43 transmits a random number to the wearable device 30, the identifier reception unit 44 receives the user ID encrypted on the basis of the random number by the wearable device 30 and the temporary ID generated by the wearable device 30 (the random number generated by the wearable device 30) from the wearable device 30. The encrypted user ID is transmitted to the server 20 by the identifier transmission unit 46 to be described below. Also, because the user ID is encrypted and the shop system 40 does not include a means for decrypting the encrypted user ID (for example, a decryption function or the like), the shop system 40 cannot specify the user ID. The temporary ID received by the identifier reception unit 44 is edited by the identifier editing unit 45 to be described below. The identifier transmission unit 46 transmits the edited temporary ID to the server 20.

Also, the shop system 40 retains the edited temporary ID in a memory or the like. When the waiting state information is transmitted to the server 20, the information delivery unit 47 to be described below transmits the retained temporary ID and waiting state information to the server 20. The identifier reception unit 44 is implemented by the communication interface of the shop system 40 or the communication control unit which controls the communication interface.

Figure 4:
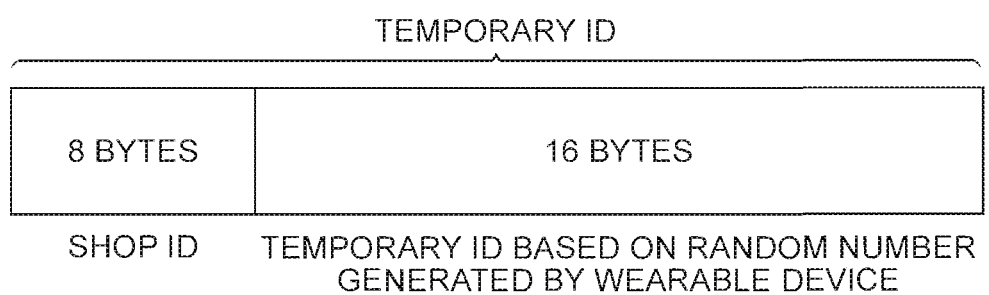
FIG. 4 is a diagram illustrating an edition example of a temporary ID.

The identifier editing unit 45 is a part which adds information for identifying the shop system 40 to the temporary ID received by the identifier reception unit 44. Specifically, the identifier editing unit 45 adds a shop ID serving as information for identifying the shop system 40 to the temporary ID. An example of the edited temporary ID is illustrated in FIG. 4. When the temporary ID received from the wearable device 30 by the identifier reception unit 44 is a 16-byte random number, the identifier editing unit 45 generates a temporary ID of a 24-byte temporary ID by adding an 8-byte shop ID to the 16-byte random number. Also, the shop ID is assumed to be pre-retained in a memory of the shop system 40. The temporary ID edited by the identifier editing unit 45 is transmitted to the server 20 by the identifier transmission unit 46. The identifier editing unit 45 is implemented by the control unit of the shop system 40.

The identifier transmission unit 46 is a part which transmits a temporary ID corresponding to the temporary ID received by the identifier reception unit 44 and an encrypted user ID to the server 20. Specifically, the identifier transmission unit 46 transmits a temporary ID obtained by the identifier editing unit 45 editing the temporary ID received from the wearable device 30 by the identifier reception unit 44 as a temporary ID corresponding to the temporary ID received by the identifier reception unit 44 to the server 20. Also, the identifier transmission unit 46 transmits the encrypted user ID received by the identifier reception unit 44 to the server 20. The identifier transmission unit 46 is implemented by the communication interface of the shop system 40 or the communication control unit which controls the communication interface.

The information delivery unit 47 is a part which transmits a temporary ID transmitted by the identifier transmission unit 46 (the temporary ID edited by the identifier editing unit 45) and waiting state information to the server 20. First, the information delivery unit 47 generates the waiting state information (information about a waiting time or the like). Specifically, the information delivery unit 47 generates the waiting state information on the basis of an input operation by a user (for example, a clerk) of the shop system 40. The input operation is an operation on an input apparatus (for example, a keyboard or a sound input apparatus) of the shop system 40. Also, in the above-mentioned input operation, the temporary ID serving as a delivery target of the waiting state information as well as the waiting state information is designated. When the waiting state information is generated, the information delivery unit 47 transmits the temporary ID of the information delivery target retained in the memory and the waiting state information to the server 20. The information delivery unit 47 is implemented is implemented by the communication interface of the shop system 40, the communication control unit which controls the communication interface, or the control unit of the shop system 40.

Next, the wearable device 30 will be described. The wearable device 30 is configured to include a temporary ID generation unit 31 (a temporary identifier acquisition means), a random number reception unit 32 (an encryption information reception means), an authentication information generation unit 33 (an encrypted identifier acquisition means), and an identifier transmission unit 34 (an identifier transmission means).

The temporary ID generation unit 31 is a part which generates a temporarily usable temporary ID. When a temporary issuance request is received from the shop system 40, the temporary ID generation unit 31 generates the temporary ID. Specifically, the temporary ID generation unit 31 generates the temporary ID by a well-known random number generation method.

Also, the temporary ID generation unit 31 may be configured to retain a previously generated temporary ID as history information of the temporary ID in a retention means such as a memory or the like of the wearable device 30 (a temporary identifier retention means) and generate a temporary ID different from the temporary ID of the history information. An example of the history information is illustrated in FIG. 5. The history information includes an issued temporary ID, a shop ID, and an expiration time. The issued temporary ID is a previously generated temporary ID. The shop ID is a shop ID of the shop system 40 transmitting the temporary ID previously generated by the identifier transmission unit 34 to be described below. The expiration time is an expiration time of the previously generated temporary ID. When the temporary ID generation unit 31 generates a temporary ID different from the temporary ID of the history information, the temporary ID generation unit 31 generates a temporary ID once and determines whether the temporary ID matches a temporary ID of the history information. The temporary ID generation unit 31 ends a temporary ID generation process when a result of the determination as mentioned above indicates that the temporary ID does not match any one of temporary IDs of the history information and iterates the generation of the temporary ID (the reissuance of the temporary ID) until the temporary ID does not match any one of the temporary IDs of the history information when the result of the determination indicates that the temporary ID matches any one of the temporary IDs of the history information.

The temporary ID generated by the temporary ID generation unit 31 is transmitted to the shop system 40 by the identifier transmission unit 34 to be described below. The temporary ID generation unit 31 is implemented by the control unit of the wearable device 30.

The random number reception unit 32 receives a random number from the shop system 40. Also, the random number reception unit 32 receives an expiration time and a shop ID from the shop system 40. The random number reception unit 32 is implemented by a communication interface of the wearable device 30 or a communication control unit which controls the communication interface.

The authentication information generation unit 33 is a part which generates an encrypted user ID using a random number received by the random number reception unit 32. Specifically, the authentication information generation unit 33 generates the encrypted user ID by a well-known encryption method using the random number and the encryption function (a function in common with the server 20) received by the random number reception unit 32. The encryption function is a function pre-retained in the memory or the like of the wearable device 30. The encrypted user ID generated by the authentication information generation unit 33 is transmitted by the identifier transmission unit 34 to be described below. The authentication information generation unit 33 is implemented by the control unit of the wearable device 30.

The identifier transmission unit 34 is a part which transmits the temporary ID generated by the temporary ID generation unit 31 and the encrypted user ID generated by the authentication information generation unit 33 to the shop system 40. The identifier transmission unit 34 is implemented by the communication interface of the wearable device 30 or the communication control unit which controls the communication interface.

(Description of Hardware Configuration Diagram)

Figure 6:
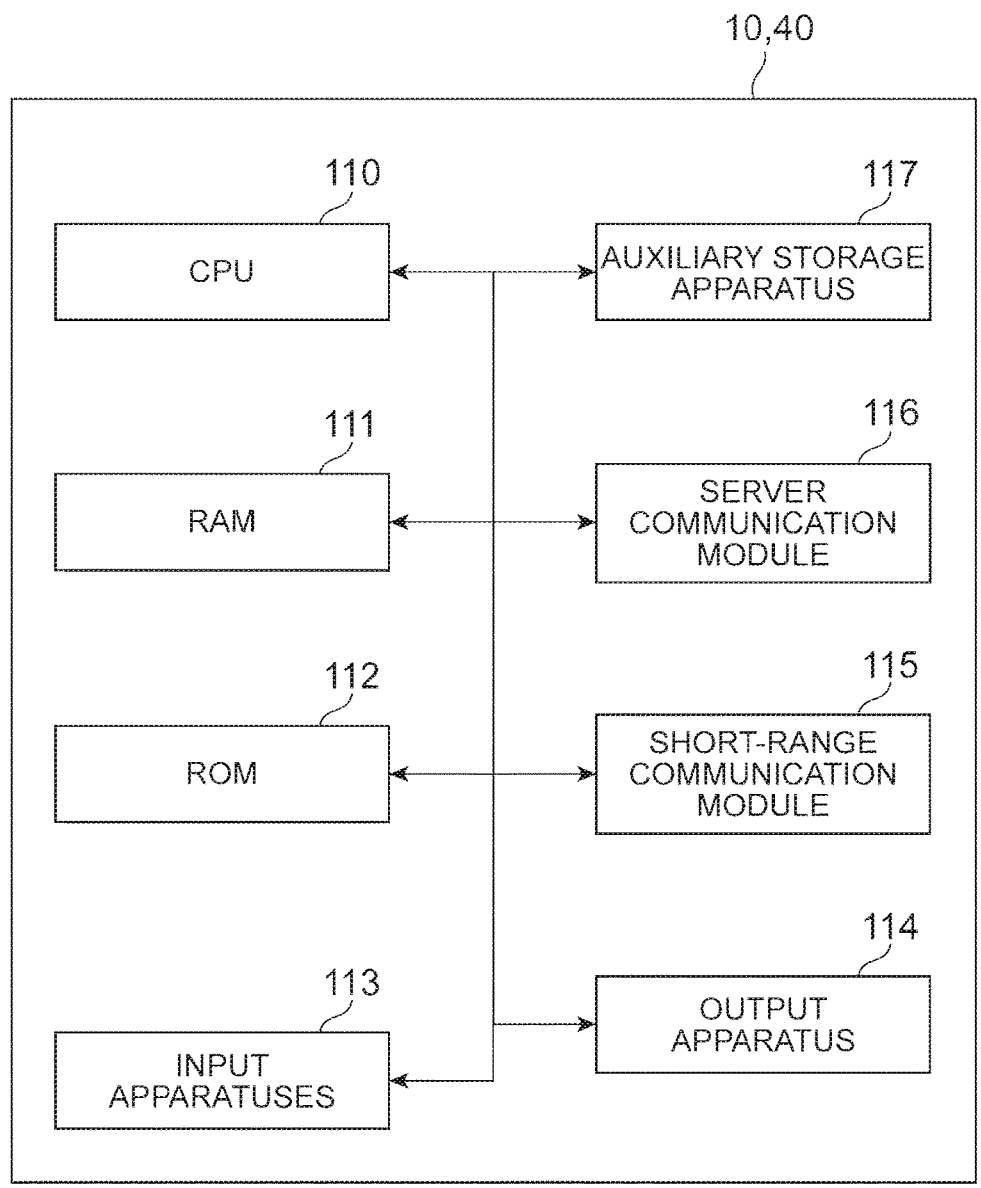
FIG. 6 is a diagram illustrating hardware configurations of a mobile device 10 and a shop system 40.

A hardware configuration diagram of the mobile device 10 and the shop system 40 will be described. As illustrated in FIG. 6, the mobile device 10 and the shop system 40 are configured as computer systems including one or more CPUs 110, a RAM 111 and a ROM 112 which are main storage apparatuses, input apparatuses 113 such as a keyboard and a mouse which are input devices, an output apparatus 114 such as a display, a short-range communication module 115 which is a communication module for short-range communication such as NFC or BLE, a server communication module 116 which is a module for communicating with the server 20 and is a data transmission/reception device such as a network card, an auxiliary storage apparatus 117 such as a semiconductor memory, etc. The mobile device 10 and the shop system 40 are implemented by loading predetermined computer software onto hardware such as the CPU 110 and the RAM 111 illustrated in FIG. 6, causing the input apparatuses 113, the output apparatus 114, the short-range communication module 115, and the server communication module 116 to operate under control of the CPU 110, and reading and writing data in the RAM 111 or the auxiliary storage apparatus 117.

Figure 7:
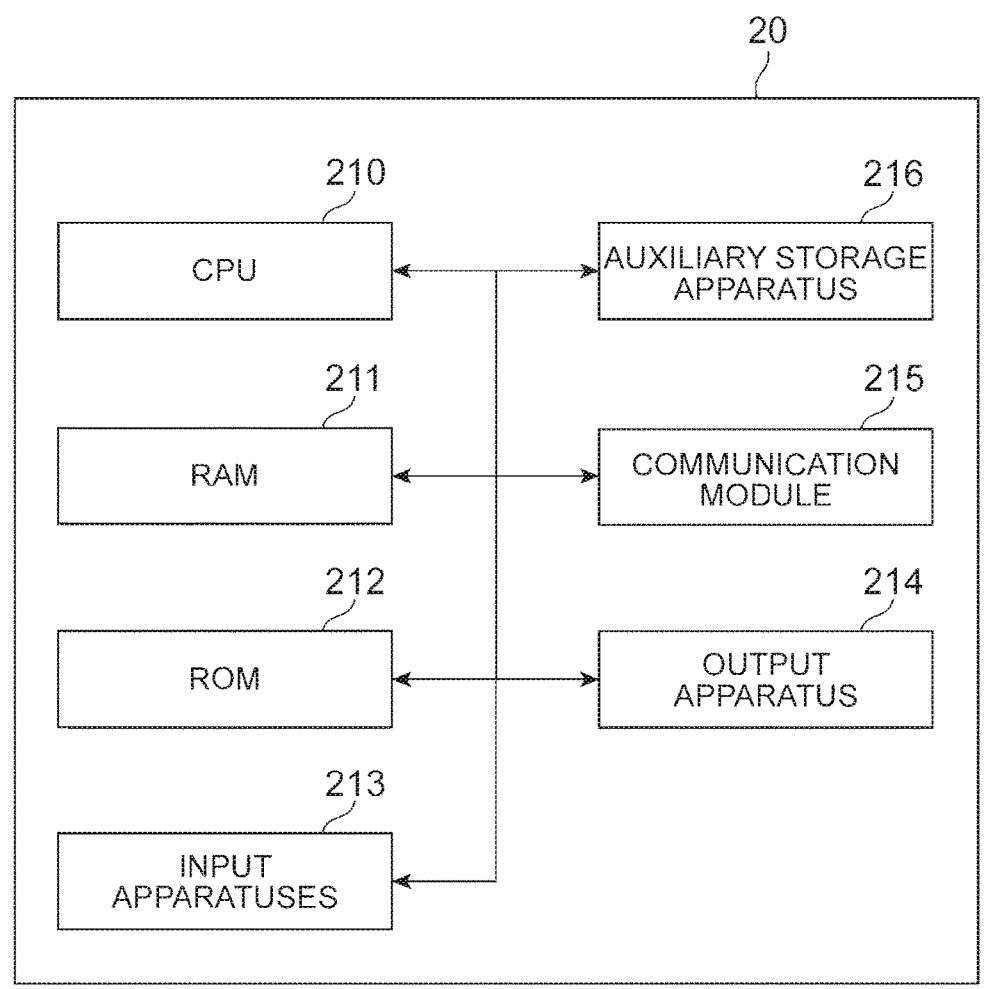
FIG. 7 is a diagram illustrating a hardware configuration of a server 20.

Next, a hardware configuration diagram of the server 20 will be described. As illustrated in FIG. 7, the server 20 is configured as a computer system including one or more CPUs 210, a RAM 211 and a ROM 212 which are main storage apparatuses, input apparatuses 213 such as a keyboard and a mouse which are input devices, an output apparatus 214 such as a display, a communication module 215 which is a data transmission/reception device such as a network card, an auxiliary storage apparatus 217 such as a semiconductor memory, etc. The server 20 is implemented by loading predetermined computer software onto hardware such as the CPU 210 and the RAM 211 illustrated in FIG. 7, causing the input apparatuses 213, the output apparatus 214, and the communication module 215 to operate under control of the CPU 210, and reading and writing data in the RAM 211 or the auxiliary storage apparatus 216.

Figure 8:
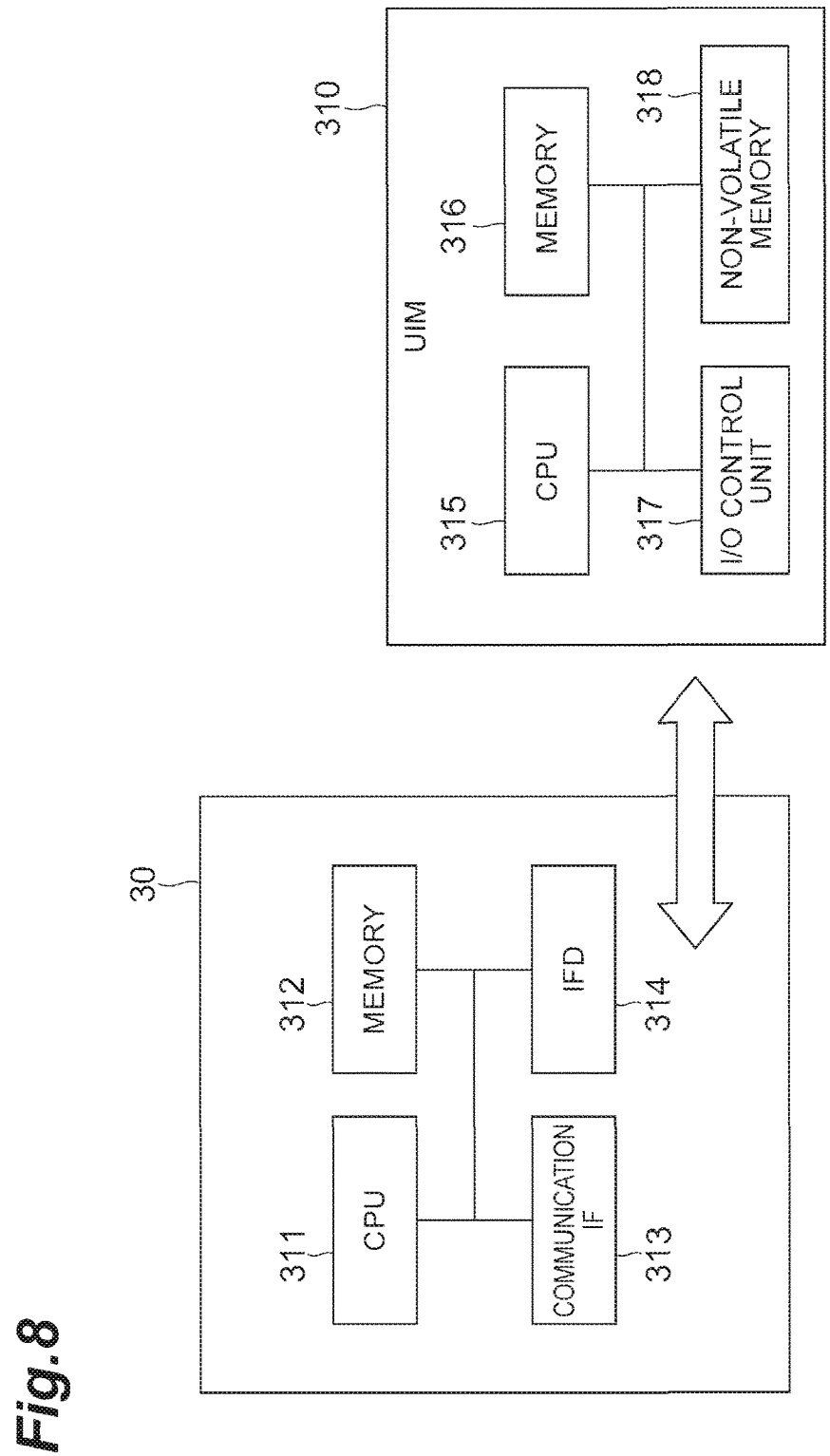
FIG. 8 is a diagram illustrating a hardware configuration of a wearable device 30.

Next, a hardware configuration diagram of the wearable device 30 will be described. As illustrated in FIG. 8, the wearable device 30 is physically constituted of, for example, a CPU 311, a memory 312 such as a ROM or a RAM, a communication interface (IF) 313 for communicating with the outside, and an interface device (IFD) 314 for exchanging data with a UIM 310.

Also, the UIM 310 is physically constituted of, for example, a CPU 315, a memory 316 such as a ROM or a RAM, a non-volatile memory 318 such as an EEPROM, and an I/O control unit 317 which controls the exchange of data with the wearable device 30. The non-volatile memory 318 of the UIM 310 is provided with a key candidate storage region for storing key candidates allocated to a public key and a private key.

Next, a process and an operation to be executed by the information delivery system 1 according to the present embodiment will be described using a sequence diagram of FIG. 9. The sequence diagram illustrated in FIG. 9 is a sequence diagram of a process in which the server 20 receives an encrypted user ID and a temporary ID transmitted from the wearable device 30 and performs the above-mentioned association using information received by the server 20 and delivers waiting state information from the shop system 40 to the mobile device 10.

First, when the shop system 40 detects that the wearable device 30 is in proximity to the shop system 40, the random number request unit 41 requests an encryption random number from the server 20 (step S1). The random number generation unit 22 of the server 20 generates a random number in response to the request of the random number from the random number request unit 41. The random number transmission unit 23 transmits the random number generated by the random number generation unit 22 to the shop system 40 as a response to the request of the random number from the random number request unit 41 (step S2). The random number reception unit 42 of the shop system 40 receives the random number from the server 20. The random number transmission unit 43 transmits the random number received by the random number reception unit 42 to the wearable device 30 and makes an issuance request for the temporary ID (step S3). The random number reception unit 32 of the wearable device 30 receives the random number from the shop system 40. The temporary ID generation unit 31 generates the temporary ID (step S4: temporary identifier acquisition step) and the authentication information generation unit 33 generates the encrypted user ID on the basis of the random number received by the random number reception unit 32 and the user ID (step S5: encrypted identifier acquisition step). The identifier transmission unit 34 transmits the encrypted user ID and the temporary ID to the shop system 40 (step S6: identifier transmission step). The identifier reception unit 44 of the shop system 40 receives the encrypted user ID and the temporary ID from the wearable device 30 (step S7: identifier reception step). The identifier editing unit 45 edits the temporary ID (step S8: identifier edition step). The identifier transmission unit 46 transmits the temporary ID edited by the identifier editing unit 45 and the encrypted user ID to the server 20 (step S9: information delivery apparatus-side identifier transmission step).

The identifier reception unit 24 receives the encrypted user ID and the temporary ID (step S9: server-side identifier reception step). The association unit 25 decrypts the encrypted user ID and performs association using the decrypted user ID and the user management information (step S10: association step). When the association is performed, the association unit 25 notifies the shop system 40 of information indicating that the association has been performed (information indicating that authentication has been performed) (step S11).

The association unit 25 provides a temporary ID issuance notification to the mobile device 10 on the basis of the association (step S12).

When the waiting state information (waiting time information) is input in the shop system 40, the information delivery unit 47 of the shop system 40 transmits the waiting state information and the temporary ID to the server 20 (step S13: information delivery step). That is, the information delivery unit 47 transmits the waiting state information addressed to the temporary ID to the server 20.

The information reception unit 26 of the server 20 receives the waiting state information and the temporary ID (step S13: information reception step). The information delivery unit 27 transmits the waiting state information to a transmission destination of the user ID corresponding to the temporary ID (step S14: information transmission step). The information reception unit 11 of the mobile device 10 receives the waiting state information and the information output unit 13 outputs the waiting state information, so that the process ends (step S14).

Also, communication between the mobile device 10 and the server 20 was set to be performed with mobile communication in the above-mentioned embodiment, but the communication may be performed with wireless LAN communication (for example, Wifi or the like). It may be performed with communication for connecting to a mobile communication network via the wireless LAN. When the communication by the wireless LAN is performed, a wireless LAN access point is used. The wireless LAN access point may be provided by a communication provider of the mobile communication network.

Also, the case in which the user ID is applied as a user identifier has been described in the above-mentioned embodiment, but a password such as a one-time password (OTP), a public key, a digital certificate, or the like may be applied. Also, a combination of a user ID and a password may be configured to be applied as a user identifier. In this case, the wearable device 30 encrypts each of the user ID and the password and transmits the encrypted user ID and password to the server 20. The server 20 retains information having the user ID, the password, and the transmission destination information for the mobile device 10 as the user management information.

The case in which a notification by email is provided to the mobile device 10 has been described in the above-mentioned embodiment, but a notification by a phone call, an Internet phone call, a message service (a short message service (SMS), a voice message service, or the like), or an application (an application using the Web) provided in the mobile device 10 may be provided.

The case in which the shop system 40 delivers the waiting state information has been described in the above-mentioned embodiment, but receipt or coupon information may be delivered. Also, it may be a temporary communication means between individuals. In this case, a portable terminal different from the above-mentioned mobile device 10 functions as the shop system 40.

In the shop system 40, the case in which the identifier edition unit 45 edits the temporary ID received from the wearable device 30 and transmits the edited temporary ID to the server 20 has been described in the above-mentioned embodiment, but the temporary ID may be transmitted to the server 20 without being edited.

Also, in the wearable device 30, the case in which the temporary ID generation unit 31 acquires a temporary ID by generating it has been described, but the temporary ID may be acquired from an apparatus other than the wearable device 30 such as the mobile device 10. In this case, the communication interface of the wearable device 30 functions as a temporary identifier acquisition means.

Also, in the wearable device 30, the case in which the authentication information generation unit 33 acquires an encrypted user ID by encrypting the user ID has been described, but the encrypted user ID may be acquired from an apparatus other than the wearable device 30 such as the mobile device 10. In this case, the communication interface of the wearable device 30 functions as the encrypted identifier acquisition means.

Although not particularly described in the above-mentioned embodiment, the identifier reception unit 44 of the shop system 40 may be configured to check whether the temporary ID received from each wearable device 30 is duplicated. Specifically, the identifier reception unit 44 compares a received temporary ID with a previously received temporary ID and requests the wearable device 30 to regenerate the temporary ID when the same temporary ID is present (duplicated).

(Operations and Effects)

Next, the operations and effects will be described. The information delivery system. 1 includes the shop system 40 which provides information, the wearable device 30 capable of performing short-range communication with the shop system 40, and the server 20 capable of communicating with the shop system 40. In the wearable device 30, the temporary ID generation unit 31 generates a temporarily usable temporary ID. The authentication information generation unit 33 encrypts a user ID which, is an identifier corresponding to the wearable device 30 to generate the encrypted user ID. The identifier transmission unit 34 transmits the temporary ID and the encrypted user ID to the shop system 40. In the shop system 40, the identifier reception unit 44 receives the temporary ID and the encrypted user ID from the wearable device 30. The identifier transmission unit 46 transmits a temporary ID corresponding to the temporary ID received by the identifier reception unit 44 and the encrypted user ID to the server 20, and the information delivery unit 47 transmits the temporary ID transmitted by the identifier transmission unit 46 and waiting state information to the server 20. In the server 20, the user ID is retained in association with an information delivery destination of the user ID. The identifier reception unit 24 receives the encrypted user ID and the temporary ID. The association unit 25 associates the temporary ID and the information delivery destination of the user ID. The information reception unit 26 receives the temporary ID and the waiting state information. The information delivery unit 27 transmits the waiting state information to the information delivery destination of the user ID corresponding to the temporary ID.

As mentioned above, the information delivery system 1 can deliver the waiting state information to be delivered by the shop system 40 to the transmission destination (the mobile device 10) corresponding to the wearable device 30 via the server 20. Also, because the wearable device 30 transmits the encrypted user ID to the shop system 40 and the shop system. 40 can identify content of the user ID, the information delivery system 1 can protect individual information (the user ID). Because the user ID is likely to be linked with important information (an address, a phone number, an email address, a purchase history, or the like), it is necessary to protect the user ID as personal information. When the wearable device 30 transmits the temporary ID and the encrypted user ID to the shop system 40 once, the waiting state information is transmitted to the transmission destination corresponding to the wearable device 30 via the server 20. Consequently, the information delivery system 1 can deliver information from the shop system 40 by a simple operation. Also, because the server 20 collectively manages user management information in the information delivery system 1, it is unnecessary to individually construct the system in each shop system 40. That is, it is only necessary to introduce the shop system 40 capable of transmitting and receiving a temporary ID and an encrypted user ID for the server 20 and transmitting the temporary ID and information about a waiting state to the server 20.

Also, in the wearable device 30, the temporary ID generation unit 31 acquires the temporary ID by generating it and the authentication information generation unit 33 acquires the encrypted user ID by generating it. In this case, it is possible to implement a simpler configuration than when a temporary identifier and an encrypted user identifier are acquired from another apparatus.

Also, in the information delivery system 1, the random number transmission unit 23 of the server 20 transmits a random number to the shop system 40. The random number reception unit 42 of the shop system 40 receives the random number and the random number transmission unit 43 transmits the random number. The random number reception unit 32 of the wearable device 30 receives the random number and the authentication information generation unit 33 generates an encrypted user ID using the random number. According to this information delivery system 1, the wearable device 30 can encrypt the user ID by a simple configuration without directly communicating with the server 20 because the random number is received from the server 20 via the shop system 40.

Also, in the information delivery system 1 the identifier editing unit 45 of the shop system 40 adds a shop ID to the temporary ID. The identifier transmission unit 46 transmits the temporary ID edited by the identifier editing unit 45. In this case, because the shop system 40 adds the shop ID which is information for identifying the shop system 40 to the temporary ID received from the wearable device 30, it is possible to prevent temporary IDs transmitted to separate shop systems 40 by a plurality of wearable devices 30 from being duplicated. For example, the same temporary ID is assumed to be transmitted from the plurality of wearable devices 30 to the separate shop systems 40. In this case, when the waiting state information addressed to the above-mentioned temporary ID is transmitted from any one shop system 40, the waiting state information is transmitted to the plurality of wearable devices 30. However, the identifier editing unit 45 of the shop system 40 adds the shop ID to the temporary ID, so that such a problem can be avoided.

Also, in the information delivery system 1, the wearable device 30 retains the temporary ID previously generated by the temporary ID generation unit 31 as history information and the temporary ID generation unit 31 generates a temporary ID different from the temporary ID retained in the history information. In this case, because the wearable device 30 generates the temporary ID different from the temporary ID previously generated by the wearable device 30, it is possible to prevent a duplicate temporary ID of the temporary ID transmitted to another shop system 40 by the wearable device 30 from being generated. That is, it is possible to prevent a temporary ID previously transmitted by the wearable device 30 from being transmitted many times and it is possible to substantially prevent the user ID of the wearable device 30 from being transmitted.

Also, the association unit 25 of the server 20 cancels the association of the temporary ID and the information delivery destination of the user ID when the expiration time has passed because the expiration time is provided in the associated temporary ID. In this case, because the association of the temporary ID and the information delivery destination of the user ID is cancelled when the expiration time of the temporary ID has passed, it is possible to prevent unnecessary information from being delivered from the shop system 40 regardless of the fact that a long time has elapsed after the transmission of the temporary ID by the wearable device 30. For example, when the user of the wearable device 30 does not use the shop of the above-mentioned shop system 40, the shop system 40 can prevent the waiting state information from being unnecessarily delivered.

REFERENCE SIGNS LIST

1 Information delivery system
10 Mobile device
11 Information reception unit
12 Information transmission unit
13 Information output unit
20 Server
21 Information retention unit
22 Random number generation unit
23 Random number transmission unit
24 Identifier reception unit
25 Association unit
26 Information reception unit
27 Information delivery unit
30 Wearable device
31 Temporary ID generation unit
32 Random number reception unit
33 Authentication information generation unit
34 Identifier transmission unit
40 Shop system
41 Random number request unit
42 Random number reception unit
43 Random number transmission unit
44 Identifier reception unit
45 Identifier editing unit
46 Identifier transmission unit
47 Information delivery unit.

The invention claimed is:

1. An information delivery system comprising:
an information delivery apparatus that provides information;
a short-range communication device that performs short-range communication with the information delivery apparatus; and
a server that communicates with the information delivery apparatus and authenticates the short-range communication device based on pre-stored information in the server, the pre-stored information comprising a user identifier associated with an information delivery destination of a user identified by the user identifier;
the short-range communication device includes circuitry to:
acquire a temporarily usable temporary identifier;
acquire an encrypted identifier from encrypting the user identifier which is an identifier corresponding to the short-range communication device; and
transmit the temporary identifier acquired and the encrypted identifier acquired to the information delivery apparatus;
the information delivery apparatus includes circuitry to:
receive the temporary identifier and the encrypted identifier from the short-range communication device;
add information for identifying the information delivery apparatus to the temporary identifier received to create a modified temporary identifier;
transmit the modified temporary identifier, with the information for identifying the information delivery apparatus added thereto, and the encrypted identifier to the server; and
transmit the information of a delivery target to the server; and
the server includes circuitry to:
retain the user identifier in association with an information delivery destination of the user identifier;
receive the modified temporary identifier, and the encrypted identifier from the information delivery apparatus;
decrypt the encrypted identifier received and associate the decrypted user identifier and the temporary identifier received in the modified temporary identifier;
receive the information of the delivery target from the information delivery apparatus;
transmit the information of the delivery target received to the information delivery destination retained in association with the user identifier corresponding to the temporary identifier received on the basis of the association; and
associate an expiration condition with the temporary identifier and cancel the association of the user identifier retained and the temporary identifier when the expiration condition occurs in order to prevent information from being delivered from the information delivery apparatus,
the circuitry of the information delivery apparatus detects that the short-range communication device is moved within a proximity of the information delivery apparatus and requests the server to transmit encryption information, which is information for encrypting the user identifier,
the circuitry of the server transmits the encryption information to the information delivery apparatus,
the circuitry of the information delivery apparatus receives the encryption information from the server,
the circuitry of the information delivery apparatus transmits the encryption information received to the short-range communication device,
the circuitry of the short-range communication device receives the encryption information from the information delivery apparatus, and
the circuitry of the short-range communication device encrypts the user identifier using the encryption information received.

2. The information delivery system according to claim 1, wherein the short-range communication device acquires the temporary identifier by generating the temporary identifier, and wherein the short-range communication device acquires the encrypted identifier by generating the encrypted identifier.

3. The information delivery system according to claim 2, wherein the short-range communication device retains a temporary identifier previously generated, and wherein the short-range communication device generates a temporary identifier different from the temporary identifier retained.

4. An information delivery method to be executed by an information delivery system including an information delivery apparatus that provides information, a short-range communication device capable of performing short-range communication with the information delivery apparatus, and a server capable of communicating with the information delivery apparatus and authenticating the short-range communication device based on pre-stored information in the server, the pre-stored information comprising a user identifier associated with an information delivery destination of a user identified by the user identifier, wherein the server retains a user identifier which is an identifier corresponding to the short-range communication device in association with an information delivery destination of the user identifier, the information delivery method comprising:

a temporary identifier acquisition step of acquiring, by the short-range communication device, a temporarily usable temporary identifier;

an encrypted identifier acquisition step of acquiring, by the short-range communication device, an encrypted identifier from encrypting the user identifier;

an identifier transmission step of transmitting, by the short-range communication device, the temporary identifier acquired in the temporary identifier acquisition step and the encrypted identifier acquired in the encrypted identifier acquisition step to the information delivery apparatus;

an identifier reception step of receiving, by the information delivery apparatus, the temporary identifier and the encrypted identifier from the short-range communication device;

an adding step of adding information for identifying the information delivery apparatus to the temporary identifier received to create a modified temporary identifier;

an information delivery apparatus-side identifier transmission step of transmitting, by the information delivery apparatus, the modified temporary identifier, with the information for identifying the information delivery apparatus added thereto, and the encrypted identifier to the server;

an information delivery step of transmitting, by the information delivery apparatus, information of a delivery target to the server;

a server-side identifier reception step of receiving, by the server, the modified temporary identifier and the encrypted identifier from the information delivery apparatus;

an association step of decrypting, by the server, the encrypted identifier received in the server-side identifier reception step and associating the temporary identifier received in the modified temporary identifier in the server-side identifier reception step and the information delivery destination of the user identifier using a decrypted user identifier;

an information reception step of receiving, by the server, the information of the delivery target transmitted by the information delivery step;

an information transmission step of transmitting, by the server, the information of the delivery target received in the information reception step to the information delivery destination of the user identifier corresponding to the temporary identifier received in the information reception step on the basis of the association in the association step; and a step of associating an expiration condition with the temporary identifier and canceling the association of the user identifier retained and the temporary identifier when the expiration condition occurs in order to prevent information from being delivered from the information delivery apparatus, the method further comprising:

detecting, by the information delivery apparatus, that the short-range communication device is moved within a proximity of the information delivery apparatus and requesting the server to transmit encryption information, which is information for encrypting the user identifier, transmitting, by the server, the encryption information to the information delivery apparatus, receiving, by the information delivery apparatus, the encryption information from the server, transmitting, by the information delivery apparatus, the encryption information received to the short-range communication device, receiving, by the short-range communication device, the encryption information from the information delivery apparatus, and encrypting, by the short-range communication device, the user identifier using the encryption information received.

5. An information delivery apparatus in an information delivery system including the information delivery apparatus that provides information, a short-range communication device capable of performing short-range communication with the information delivery apparatus, and a server capable of communicating with the information delivery apparatus and authenticating the short-range communication device based on pre-stored information in the server, the pre-stored information comprising a user identifier associated with an information delivery destination of a user identified by the user identifier, the information delivery apparatus comprising circuitry to:

receive a temporary identifier and an encrypted identifier from the short-range communication device;

add information for identifying the information delivery apparatus to the temporary identifier received to create a modified temporary identifier;

transmit the modified temporary identifier, with the information for identifying the information delivery apparatus added thereto, and the encrypted identifier to the server;

transmit information of a delivery target to the server;

detect that the short-range communication device is moved within a proximity of the information delivery apparatus and requests the server to transmit encryption information, which is information for encrypting the user identifier, which is an identifier corresponding to the short-range communication device;

receive the encryption information from the server; and transmit the encryption information received to the short-range communication device, the short-range communication device encrypts the user identifier using the encryption information received, and the server associates an expiration condition with the temporary identifier received in the modified temporary identifier and cancel the association of the user identifier retained and the temporary identifier when the expiration condition occurs in order to prevent information from being delivered from the information delivery apparatus.

6. A short-range communication device in an information delivery system including an information delivery apparatus that provides information, the short-range communication device capable of performing short-range communication with the information delivery apparatus, and a server capable of communicating with the information delivery apparatus and authenticating the short-range communication device based on pre-stored information in the server, the pre-stored information comprising a user identifier associated with an information delivery destination of a user identified by the user identifier, the short-range communication device comprising circuitry to:

acquire a temporarily usable temporary identifier;

acquire an encrypted identifier from encrypting the user identifier which is an identifier corresponding to the short-range communication device;

transmit the temporary identifier acquired and the encrypted identifier acquired to the information delivery apparatus;

receive encrypted information, which is information for encrypting the user identifier, from the information delivery apparatus, the server transmitting the encryption information to the information delivery apparatus in response to a request from the information delivery apparatus after the information delivery apparatus detects that the short-range communication device is moved within a proximity of the information delivery apparatus; and encrypt the user identifier using the encryption information received, the information delivery apparatus adds information for identifying the information delivery apparatus to the temporary identifier received to create a modified temporary identifier, information delivery apparatus transmits the modified temporary identifier, with the information for identifying the information delivery apparatus added thereto, to the server, and the server associates an expiration condition with the temporary identifier received in the modified temporary identifier and cancel the association of the user identifier retained and the temporary identifier when the expiration condition occurs in order to prevent information from being delivered from the information delivery apparatus.

7. A server in an information delivery system including an information delivery apparatus information, a short-range communication device capable of performing short-range communication with the information delivery apparatus, and the server capable of communicating with the information delivery apparatus and authenticating the short-range communication device based on pre-stored information in the server, the pre-stored information comprising a user identifier associated with an information delivery destination of a user identified by the user identifier, the server comprising circuitry to:

retain the user identifier in association with the information delivery destination of the user identifier;

receive a modified temporary identifier, that includes a temporary identifier, and an encrypted identifier from the information delivery apparatus;

decrypt the encrypted identifier received and associate a decrypted user identifier and the temporary identifier received;

receive information of a delivery target from the information delivery apparatus;

transmit the information of the delivery target received to the information delivery destination retained in association with the user identifier corresponding to the temporary identifier received on the basis of the associations; and transmit encryption information, which is information for encrypting the user identifier, to the information delivery apparatus, in response to a request received from the information delivery apparatus after the information delivery apparatus detects that the short-range communication device is moved within a proximity of the information delivery apparatus, the information delivery apparatus transmits the encryption information to the short-range communication device in response to receiving the encryption information, and the short-range communication device encrypts the user identifier using the encryption information, the information delivery apparatus adds information for identifying the information delivery apparatus to the temporary identifier received to create the modified temporary identifier, the information delivery apparatus transmits the modified temporary identifier, with the information for identifying the information delivery apparatus added thereto, to the server, and the server circuitry of the server associates an expiration condition with the temporary identifier and cancel the association of the user identifier retained and the temporary identifier when the expiration condition occurs in order to prevent information from being delivered from the information delivery apparatus.

* * * * *